(12) United States Patent
Ikarashi (10) Patent No.: US 11,157,612 B2
(45) Date of Patent: Oct. 26, 2021

(54) SECRET TAMPERING DETECTION SYSTEM, SECRET TAMPERING DETECTION APPARATUS, SECRET TAMPERING DETECTION METHOD, AND PROGRAM

(71) Applicant: NIPPON TELEGRAPH AND TELEPHONE CORPORATION, Chiyoda-ku (JP)

(72) Inventor: Dai Ikarashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 100 days.

(21) Appl. No.: 16/612,549

(22) PCT Filed: May 11, 2018

(86) PCT No.: PCT/JP2018/018389
§ 371 (c)(1),
(2) Date: Nov. 11, 2019

(87) PCT Pub. No.: WO2018/216512
PCT Pub. Date: Nov. 29, 2018

(65) Prior Publication Data
US 2020/0125724 A1   Apr. 23, 2020

(30) Foreign Application Priority Data
May 25, 2017  (JP) .............................. JP2017-103292

(51) Int. Cl.
*H04L 29/00* (2006.01)
*G06F 21/55* (2013.01)
*G06F 21/64* (2013.01)

(52) U.S. Cl.
CPC ............ *G06F 21/552* (2013.01); *G06F 21/64* (2013.01); *G06F 2221/033* (2013.01)

(58) Field of Classification Search
CPC ........ G06F 21/62; G06F 21/552; G06F 21/64; G06F 2221/033
See application file for complete search history.

(56) References Cited

U.S. PATENT DOCUMENTS

2009/0177873 A1* 7/2009 Sato .................... G06F 21/54
712/233
2012/0284530 A1* 11/2012 Takashima ............ H04L 9/0847
713/189
2015/0358152 A1  12/2015 Ikarashi et al.

FOREIGN PATENT DOCUMENTS

JP       2016-146530 A   8/2016
WO   WO 2014/112550 A1   7/2014

OTHER PUBLICATIONS

International Search Report dated Aug. 14, 2018 in PCT/JP2018/018389 filed May 11, 2018.
(Continued)

*Primary Examiner* — Ghazal B Shehni
(74) *Attorney, Agent, or Firm* — Oblon, McClelland, Maier & Neustadt, L.L.P.

(57) ABSTRACT

To detect tampering in secure computation while maintaining confidentiality with a little communication traffic. A random number generation part (11) generates $[\to r_i]$, $[\to s_i]$. A random number multiplication part (12) computes $[\to t_i]:=[\to r_i \to s_i]$. A secret multiplication part (13) computes $[\to z]:=[\to x \to y]$. A random number verification part (14) discloses a $p_{i,j}$th element of each of $[\to r_i]$, $[\to s_i]$, $[\to t_i]$ and confirms whether the element has integrity as multiplication. A random number substitution part (15) randomly substitutes elements in each of $[\to r_i]$, $[\to s_i]$, $[\to t_i]$ except for the $p_{i,j}$-th element to generate $[\to r'_i]$, $[\to s'_i]$, $[\to t'_i]$. A subtraction (Continued)

value disclosure part (16) computes $[\vec{x}-\vec{r'}_i], [\vec{x}-\vec{s'}_i]$. A verification value computing part (17) computes $[\vec{c}_i]:=[\vec{z}]-(\vec{x}-\vec{r'}_i)[\vec{y}]-(\vec{y}-\vec{s'}_i)[\vec{r'}_i]-[\vec{t'}_i]$. A verification value confirmation part (18) confirms that verification values $c_i$ are all zero.

6 Claims, 3 Drawing Sheets

(56) References Cited

OTHER PUBLICATIONS

Jun Furukawa, et al., "High-Throughput Secure Three-Party Computation for Malicious Adversaries and an Honest Majority," IACR Cryptology ePrint Archive, Report 2016:944, 2016, pp. 1-36.

Dai Ikarashi, et al., "Actively Private and Correct MPC Scheme in t<n/2 from Passively Secure Schemes with Small Overhead," IACR Cryptology ePrint Archive, Report 2014:304, 2014, 18 Pages.

Ronald Cramer, et al., "Share Conversion, Pseudorandom Secret-Sharing and Applications to Secure Computation," TCC 2005, vol. 3378 of Lecture Notes in Computer Science, 2005, pp. 342-362.

* cited by examiner

SECRET TAMPERING DETECTION SYSTEM, SECRET TAMPERING DETECTION APPARATUS, SECRET TAMPERING DETECTION METHOD, AND PROGRAM

TECHNICAL FIELD

The present invention relates to a secure computation technique and particularly relates to a technique for detecting tampering in secure computation while maintaining confidentiality.

BACKGROUND ART

As a technique for detecting tampering while maintaining confidentiality in secure computation, there is a technique described in Non-patent literature 1 for example. The prior art described in Non-patent literature 1 is a technique in which pre-data called a multiplication triple is generated and tampering in secure computation is detected using the multiplication triple.

PRIOR ART LITERATURE

Non-Patent Literature

Non-patent literature 1: J. Furukawa, Y. Lindell, A. Nof, and O. Weinstein, "High-throughput secure three-party computation for malicious adversaries and an honest majority", IACR Cryptology ePrint Archive, 2016:944, 2016

SUMMARY OF THE INVENTION

Problems to be Solved by the Invention

In the prior art, it is necessary to previously generate the multiplication triple, which may increase a communication traffic.

An object of the present invention is to provide a secret tampering detection technique that can detect tampering in secure computation while maintaining confidentiality with a little communication traffic.

Means to Solve the Problems

In order to solve the above problem, a secret tampering detection system of the present invention is a secret tampering detection system, in which σ represents an arbitrary integer of 1 or more, N and D represent predetermined natural numbers, i represents each integer of 0 or more and less than σ, and j represents each integer of 0 or more and less than D, the secret tampering detection system including at least three secret tampering detection apparatuses, the secret tampering detection system inputting a share $[\vec{x}]$ that becomes a vector $\vec{x}$ with N elements when reconstructed and a share $[\vec{y}]$ that becomes a vector $\vec{y}$ with N elements when reconstructed, and outputting a share $[\vec{z}]$ that becomes a vector $\vec{z}$ when reconstructed, the vector $\vec{z}$ being a result of multiplying the vector $\vec{x}$ and the vector $\vec{y}$ for each of the elements. Each of the secret tampering detection apparatuses includes a random number generation part that generates, for each integer i, σ shares $[\vec{r}_i]$ each of which becomes a random number vector $\vec{r}_i$ with N+D elements when reconstructed and σ shares $[\vec{s}_i]$ each of which becomes a random number vector $\vec{s}_i$ with N+D elements when reconstructed, a random number multiplication part that multiplies, for each integer i, the share $[\vec{r}_i]$ and the share $[\vec{s}_i]$ by secure computation to generate σ shares $[\vec{t}_i]$ each of which becomes a vector $\vec{t}_i$ when reconstructed, the vector $\vec{t}_i$ being a result of multiplying the vector $\vec{r}_i$ and the vector $\vec{s}_i$ for each of the elements, a secret multiplication part that multiplies the share $[\vec{x}]$ and the share $[\vec{y}]$ by secure computation to generate the share $[\vec{z}]$, a random number verification part that randomly selects, for each integer i, D different integers $p_{i,j}$, D being 0 or more and less than D+N, and discloses a $p_{i,j}$-th element of each of the shares $[\vec{r}_i], [\vec{s}_i], [\vec{t}_i]$, to confirm whether a set of the disclosed values corresponding respectively to the shares $[\vec{r}_i], [\vec{s}_i], [\vec{t}_i]$ has integrity as multiplication, a random number substitution part that generates, for each integer i, shares $[\vec{r}'_i], [\vec{s}'_i], [\vec{t}'_i]$ obtained by performing random substitution on elements of each of the shares $[\vec{r}_i], [\vec{s}_i], [\vec{t}_i]$ except for the $p_{i,j}$-th element, a subtraction value disclosure part that computes and discloses $[\vec{x}-\vec{r}'_i], [\vec{y}-\vec{s}'_i]$ for each integer i, a verification value computing part that computes, for each integer i, $[\vec{c}_i]:=[\vec{z}]-(\vec{x}-\vec{r}'_i)[\vec{y}]-(\vec{y}-\vec{s}'_i)[\vec{r}'_i]-[\vec{t}'_i]$ to generate a share $[\vec{c}_i]$ that becomes a vector $\vec{c}_i$ of a verification value $c_i$ when reconstructed, and a verification value confirmation part that confirms, for each integer i, that the verification values $c_i$ are all zero by using the share $[\vec{c}_i]$.

Effect of the Invention

According to the present invention, it is possible to detect tampering in secure computation while maintaining confidentiality with a little communication traffic.

DETAILED DESCRIPTION OF THE EMBODIMENT

Hereinafter, an embodiment of the present invention will be described in detail. Note that constituent parts having the same function in the drawings are denoted by the same numeral, and the repeated description thereof will be omitted.

A right arrow "$\rightarrow$" as a superscript which is used in the present specification represents a vector. Although "$\rightarrow$" should originally be put immediately above a following character, by limitation of the text notation, "$\rightarrow$" will be put immediately before the character. In each formula, the symbol is put in its original position, namely, directly above the character. For example, a text with "$\rightarrow$x" means the same as the following expression in the formula.

$$\vec{x}$$

[x] represents that a certain value x has been subjected to secret sharing. [X] represents a set of data with all sources of a certain set X subjected to the secret sharing. Hereinafter, a value subjected to the secret sharing is also referred to as a "share." $\vec{x} \cdot \vec{y}$ represents a vector as a result of multiplying a vector $\vec{x}$ and a vector $\vec{y}$ for each element. F represents an arbitrary field.

An embodiment of the present invention is a secret tampering detection system and method which perform multiplication with tampering detection, obtained by improving the secret tampering detection technique described in Non-patent literature 1. The secret tampering detection system and method of the embodiment execute a multiplication protocol with tampering detection shown in the following formula.

Scheme 1: Multiplication with tampering detection
Input: $[\vec{x}], [\vec{y}] \in [F]^N$
Output: $[\vec{x}\vec{y}] \in [F]^N$, but no output when tampering is detected
Parameters: $\sigma \geq 1, D \in N$
1: Generating random number vector $[\vec{r}_i], [\vec{s}_i] \in [F]^{N+D}$.
2: Calculating $[\vec{t}_i] := [\vec{r}_i \vec{s}_i]$ for each $0 \leq i < \sigma$.
3: Calculating $[\vec{z}] := [\vec{x}\vec{y}]$ and confirming that communication related to the computing has been terminated.
4: Randomly selecting positions $p_{i,0}, \ldots, p_{i,D-1}$ for each $0 \leq i < \sigma$.
Disclosing a $p_{i,j}$-th element corresponding to each $0 \leq j < D$ out of each of vectors $[\vec{r}_i], [\vec{s}_i], [\vec{t}_i]$ and confirming that its value has integrity as multiplication.
In the case of no integrity, tampering detection terminates.
Substituting the remaining, undisclosed elements by random substitution $\pi_i$ to obtain vectors red, $[\vec{r}_i], [\vec{s}_i], [\vec{t}_i] \in [F]^N$.
5: Disclosing $[\vec{x}-\vec{r}'_i], [\vec{y}-\vec{s}'_i]$.
6: Calculating $[\vec{c}_i] := [\vec{z}] - (\vec{x}-\vec{r}'_i)[\vec{y}] - (\vec{y}-\vec{s}'_i)[\vec{r}'_i] - [\vec{t}'_i]$.
7: Confirming that all elements of $[\vec{c}_i]$ are zero for each $0 \leq i < \sigma$.
When an element which is not zero is present, tampering detection terminates.

In the above multiplication protocol with tampering detection, the following three secure computation protocols are used. The first is a multiplication protocol without tampering detection to be executed in steps 2 and 3. The existing multiplication protocol without tampering detection is described in Reference Literature 1 and the like, for example. The second is a random number generation protocol with tampering detection to be executed in step 1. The existing random number generation protocol with tampering detection is described in Reference Literature 2 and the like, for example. The third is a disclosure protocol with tampering detection to be executed in steps 4 and 5. The existing disclosure protocol with tampering detection is described in Reference Literature 3 and the like, for example.

Reference Literature 1: D. Ikarashi, R. Kikuchi, K. Hamada, and K. Chida, "Actively private and correct MPC scheme in t<n/2 from passively secure schemes with small overhead", IACR Cryptology ePrint Archive, 2014:304, 2014

Reference Literature 2: R. Cramer, I. Damgard, and Y Ishai, "Share conversion, pseudorandom secret-sharing and applications to secure computation", TCC, Vol. 3378 of Lecture Notes in Computer Science, pp. 342-362. Springer, 2005.

Reference Literature 3: Japanese Patent Application Laid Open No. 2016-146530

Figure 1:
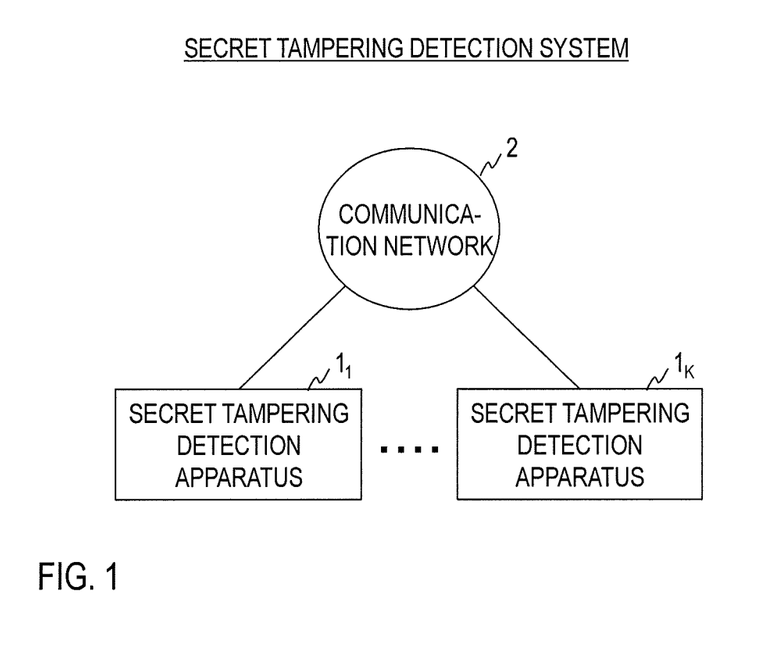
FIG. 1 is a diagram illustrating a functional configuration of a secret tampering detection system.

A configuration example of a secret tampering detection system of the embodiment will be described with reference to FIG. 1. The secret tampering detection system includes K ($\geq 3$) secret tampering detection apparatuses $1_1, \ldots, 1_K$. In the present embodiment, each of the secret tampering detection apparatuses $1_1, \ldots, 1_K$ is connected to a communication network 2. The communication network 2 is a circuit-switching or packet-switching communication network configured so that each of the connected apparatuses can communicate with each other, and for example, the Internet, a local area network (LAN), a wide area network (WAN), or the like can be used. Note that each apparatus is not necessarily required to be able to communicate online via the communication network 2. For example, information to be input into each of the secret tampering detection apparatuses $1_1, \ldots, 1_K$ may be stored into a portable recording medium such as a magnetic tape or a USB memory, and may be input into each of the secret tampering detection apparatuses $1_1, \ldots, 1_K$ offline from the portable recording medium.

Figure 2:
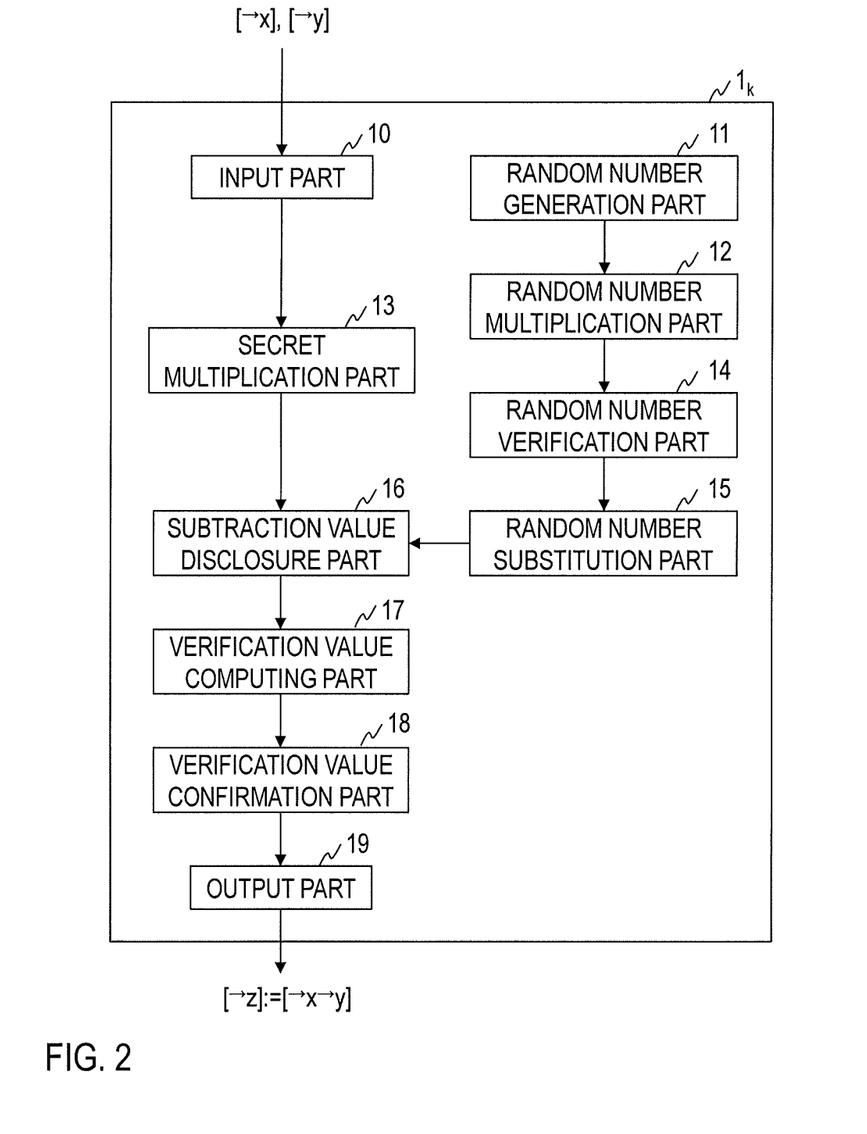
FIG. 2 is a diagram illustrating a functional configuration of a secret tampering detection apparatus.

A configuration example of a secret tampering detection apparatus $1_k$ (k=1, ..., K) included in the secret tampering detection system will be described with reference to FIG. 2. For example, as shown in FIG. 2, the secret tampering detection apparatus $1_k$ includes an input part 10, a random number generation part 11, a random number multiplication part 12, a secret multiplication part 13, a random number verification part 14, a random number substitution part 15, a subtraction value disclosure part 16, a verification value computing part 17, a verification value confirmation part 18, and an output part 19. The secret tampering detection apparatus $1_k$ ($1 \leq k \leq K$) performs processing of each step described below in cooperation with another secret tampering detection apparatus $1_{k'}$ (k'=1, ..., K, but k≠k') to realize a secret tampering detection method according to the embodiment.

The secret tampering detection apparatus $1_k$ is, for example, a special apparatus configured by reading a special program into a known or dedicated computer having a central processing unit (CPU), a main storage (random access memory: RAM), and the like. The secret tampering detection apparatus $1_k$ executes each processing under the control of the central processing unit, for example. Data input into the secret tampering detection apparatus $1_k$ and data obtained in each processing are stored into, for example, the main storage, and the data stored into the main storage is read out to the central processing unit as required and used for another processing. At least a portion of each processing part of the secret tampering detection apparatus $1_k$ may be formed by hardware such as an integrated circuit.

Figure 3:
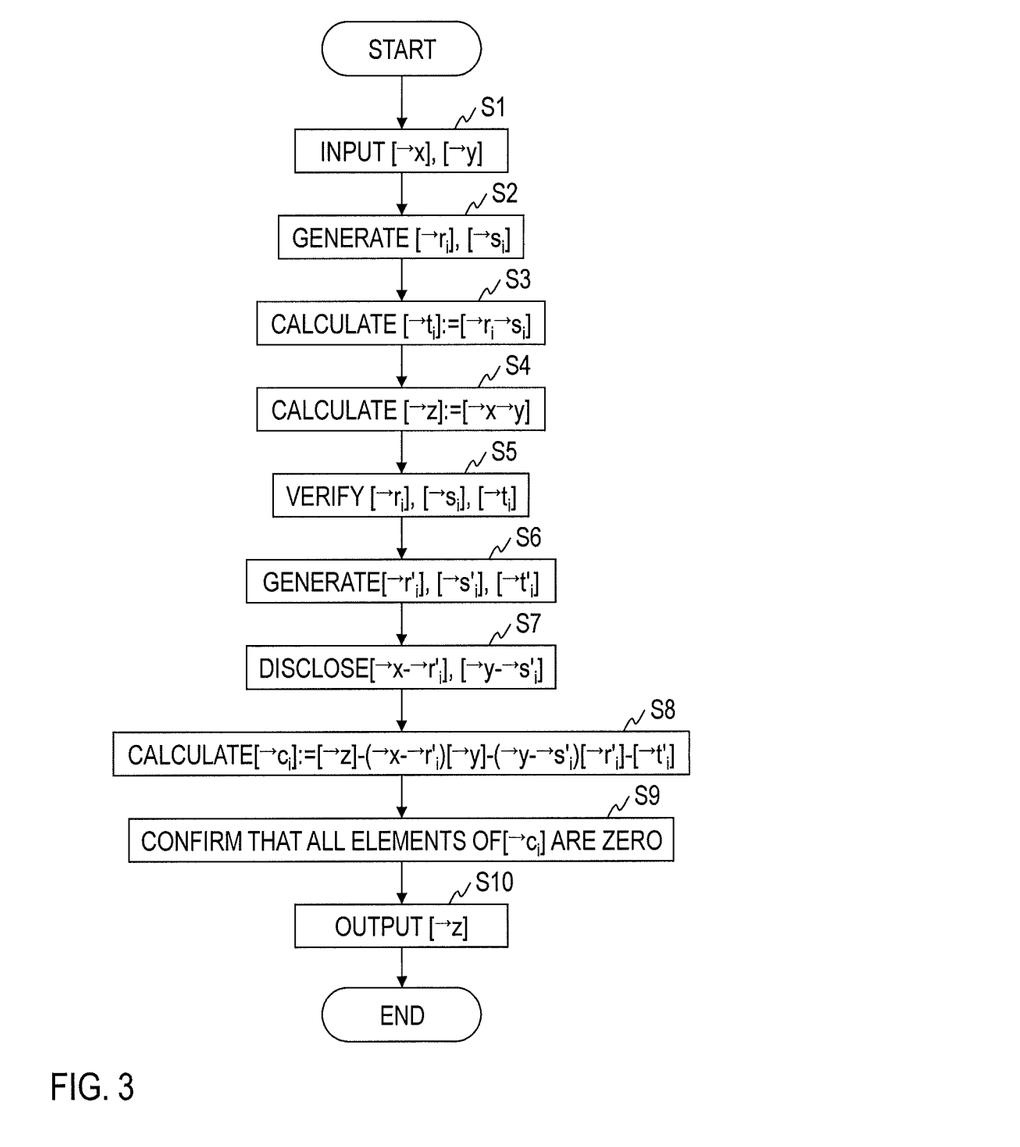
FIG. 3 is a diagram illustrating a processing flow of a secret tampering detection method.

A processing procedure of the secret tampering detection method, which is executed by the secret tampering detection system of the embodiment, will be described with reference to FIG. 3.

In step S1, shares $[\vec{x}], [\vec{y}] \in [F]^N$ to be multiplied are input into the input part 10 of each secret tampering detection apparatus $1_k$. $[\vec{x}]$ is a share which becomes a vector $\vec{x}$ with N elements when reconstructed. $[\vec{y}]$ is a share which becomes a vector $\vec{y}$ with N elements when reconstructed. The input part 10 inputs the shares $[\vec{x}], [\vec{y}]$ into the secret multiplication part 13.

In step S2, for each integer i satisfying $0 \leq i < \sigma$, the random number generation part 11 of each secret tampering detection apparatus $1_k$ generates $\sigma$ shares $[\vec{r}_i]$ each of which becomes a random number vector $\vec{r}_i$ with N+D elements when reconstructed and $\sigma$ shares $[\vec{s}_i]$ each of which becomes a random number vector $\vec{s}_i$ with N+D elements when reconstructed, by using the random number generation protocol with tampering detection. Here, $\sigma$ is a previously set integer of 1 or more. As $\sigma$ is greater, the tampering success probability decreases, but the computing amount increases. Therefore, the value of $\sigma$ may be appropriately set in view of desired safety and convenience. For example, the protocol described in above Reference Literature 2 can be applied to the random number generation protocol with tampering detection. The random number generation part 11 inputs the shares [$\vec{r}_i$], [$\vec{s}_i$] into the random number multiplication part 12.

In step S3, the random number multiplication part 12 of each secret tampering detection apparatus $1_k$ receives the shares [$\vec{r}_i$], [$\vec{s}_i$] from the random number generation part 11, and for each integer i satisfying $0 \le i < \sigma$, the random number multiplication part 12 multiplies the share [$\vec{r}_i$] and the share [$\vec{s}_i$] by the multiplication protocol without tampering detection to generate σ shares [$\vec{t}_i$]:[$\vec{r}_i \vec{s}_i$] each of which becomes a vector $\vec{t}_i$ when reconstructed, the vector $\vec{t}_i$ being a result of multiplying the vector $\vec{r}_i$ and the vector $\vec{s}_i$ for each element. For example, the protocol described in above Reference Literature 1 can be applied to the multiplication protocol without tampering detection. The random number multiplication part 12 inputs the shares [$\vec{r}_i$], [$\vec{s}_i$], [$\vec{t}_i$] as a set into the random number verification part 14.

In step S4, the secret multiplication part 13 of each secret tampering detection apparatus $1_k$ receives the shares [$\vec{x}$], [$\vec{y}$] from the input part 10, multiplies the share [$\vec{x}$] and the share [$\vec{y}$] by using the multiplication protocol without tampering detection, and computes the share [$\vec{z}$]:=[$\vec{x} \vec{y}$] which becomes a vector $\vec{z}$ when reconstructed, the vector $\vec{z}$ being a result of multiplying the vector $\vec{x}$ and the vector $\vec{y}$ for each element. The secret multiplication part 13 inputs the shares [$\vec{x}$], [$\vec{y}$] into the subtraction value disclosure part 16 and inputs the shares [$\vec{y}$], [$\vec{z}$] into the verification value computing part 17.

In step S5, the random number verification part 14 of each secret tampering detection apparatus $1_k$ receives the set of the shares [$\vec{r}_i$], [$\vec{s}_i$], [$\vec{t}_i$] from the random number multiplication part 12 and randomly selects D different integers $p_{i,0}, \ldots, p_{i,D-1}$ D being 0 or more and less than D+N, for each integer i satisfying $0 \le i < \sigma$. Here, D is a predetermined natural number. Subsequently, the random number verification part 14 discloses a $p_{i,j}$-th element corresponding to each integer j that satisfies $0 \le j < D$ out of each of the shares [$\vec{r}_i$], [$\vec{s}_i$], [$\vec{t}_i$] by using the disclosure protocol with tampering detection, to confirm whether a set of the disclosed values corresponding respectively to the shares [$\vec{r}_i$], [$\vec{s}_i$], [$\vec{t}_i$] has integrity as multiplication. For example, the protocol described in above Reference Literature 3 can be applied to the disclosure protocol with tampering detection. When there is a set of values without integrity as multiplication, the output part 19 outputs information indicating that tampering has been detected, and terminates the processing. When all the sets of values have integrity as multiplication, the random number verification part 14 inputs the shares [$\vec{r}_i$], [$\vec{s}_i$], [$\vec{t}_i$] and the integer $p_{i,j}$ into the random number substitution part 15.

In step S6, the random number substitution part 15 receives the shares [$\vec{r}_i$], [$\vec{s}_i$], [$\vec{t}_i$] and an integer $p_{i,j}$ from the random number verification part 14, and for each integer i satisfying $0 \le i < \sigma$, the random number substitution part 15 substitutes undisclosed elements (i.e., elements except for the $p_{i,j}$-th element) of each of the shares [$\vec{r}_i$], [$\vec{s}_i$], [$\vec{t}_i$] by previously set random substitution $\pi_i$ to generate shares [$\vec{r}'_i$], [$\vec{s}'_i$], [$\vec{t}'_i$]∈[F]$^N$. The random number substitution part 15 inputs the shares [$\vec{r}'_i$], [$\vec{s}'_i$] into the subtraction value disclosure part 16 and inputs the shares [$\vec{r}'_i$], [$\vec{t}'_i$] into the verification value computing part 17.

In step S7, the subtraction value disclosure part 16 of each secret tampering detection apparatus $1_k$ receives the shares [$\vec{x}$], [$\vec{y}$] from the secret multiplication part 13 and the shares [$\vec{r}'_i$], [$\vec{s}'_i$] from the random number substitution part 15, and for each integer i satisfying $0 \le i < \sigma$, the subtraction value disclosure part 16 computes and discloses [$\vec{x} - \vec{r}'_i$], [$\vec{y} - \vec{s}'_i$] by using the disclosure protocol with tampering detection. The subtraction value disclosure part 16 inputs the disclosed vectors ($\vec{x} - \vec{r}'_i$), ($\vec{y} - \vec{s}'_i$) into the verification value computing part 17.

In step S8, the verification value computing part 17 of each secret tampering detection apparatus $1_k$ receives the shares [$\vec{y}$], [$\vec{z}$] from the secret multiplication part 13, the shares [$\vec{r}'_i$], [$\vec{t}'_i$] from the random number substitution part 15, and the vectors ($\vec{x} - \vec{r}'_i$), ($\vec{y} - \vec{s}'_i$) from the subtraction value disclosure part 16, and for each integer i satisfying $0 \le i < \sigma$, the verification value computing part 17 computes Formula (1) to generate a share [$\vec{c}_i$] which becomes a vector $\vec{c}_i$ of a verification value $c_i$ when reconstructed. The verification value computing part 17 inputs the shares [$\vec{z}$], [$\vec{c}_i$] into the verification value confirmation part 18.

$$[\vec{c}_i] := [\vec{z}] - (\vec{x} - \vec{r}'_i)[\vec{y}] - (\vec{y} - \vec{s}'_i)[\vec{r}'_i] - [\vec{t}'_i] \qquad (1)$$

In step S9, the verification value confirmation part 18 of each secret tampering detection apparatus $1_k$ receives the shares [$\vec{z}$], [$\vec{c}_i$] from the verification value computing part 17, and for each integer i satisfying $0 \le i < \sigma$, the verification value confirmation part 18 discloses the vector $\vec{c}_i$ of the verification value $c_i$ from the share [$\vec{c}_i$] by using the disclosure protocol with tampering detection. The verification value confirmation part 18 then confirms that all elements of the disclosed vector $\vec{c}_i$ are zero. When an element which is not zero is included in the disclosed vector $\vec{c}_i$, the output part 19 outputs information indicating that tampering has been detected, and terminates the processing. When all the elements of the disclosed vector $\vec{c}_i$ are zero, the verification value confirmation part 18 inputs the received vector [$\vec{z}$] into the output part 19.

In step S10, the output part 19 of the secret tampering detection apparatus $1_k$ outputs the vector [$\vec{z}$] received from the verification value confirmation part 18.

Generally, in the multiplication protocol without tampering detection, an attacker would be able to perform tampering. However, in the secret tampering detection system of the embodiment, after the multiplication is performed in step S4, the random number vector is verified in step S5 to prevent the tampering. In order for the attacker to succeed in tampering, the attacker should perform tampering in step S3 as well and perform tampering so as to make the share [$\vec{t}_i$] to be used for the verification consistent. However, as the number of times of tampering is increased, the probability of detecting tampering increases due to the disclosure in step S5. Conversely, as the number of times of tampering is decreased, the probability of illegal passage of the verification is decreased. By performing σ times of verification with such properties, the tampering success probability can be O(N$^{-\sigma}$).

The above embodiment can be made further efficient in such a manner as follows. In the above embodiment, the confirmation of whether all the verification values $c_i$ are zero in step S9 has been performed by disclosing the verification values $c_i$ from the share [$\vec{c}_i$] and confirming each of those. Here, by computing a checksum formed by a product sum of each element of the share [$\vec{c}_i$] of the vector $\vec{c}_i$ of the verification value $c_i$ with a random number and confirming that the checksum is zero, it is possible to confirm the verification values with the communication traffic not depending on the size of N. As such a checksum, for example, a checksum described in Reference Literature 4 below can be used.

Reference Literature 4: International Publication No. WO 2014/112550

The checksum described in Reference Literature 4 is computed as follows. In the following description, q is an integer of 2 or more, $\rho$ is the minimum integer of (N+D)/q or more, and R is a ring. The verification value confirmation part 18 divides the share $[\vec{c}_i]$, which becomes the vector $\vec{c}_i$ of the verification value $c_i$ when reconstructed, into q pieces each from the head to generate $\rho$ value vectors $A_0, \ldots, A_{\rho-1}$. When the number of elements of the last value vector $A_{\rho-1}$ is not q at the time of division, the elements are padded with any value (e.g., 0) so that the number of elements is q. The verification value confirmation part 18 selects a random number $r \in R^q$ and computes a checksum c by Formula (2).

$$c := \sum_{0 \le i < \rho} A_i r^{i+1} \tag{2}$$

At this time, the multiplication of the vectors is performed using a function f defined by Formulas (3) and (4).

$$f(\vec{x}, \vec{y}) := f_0(\vec{x}, \vec{y}), \ldots, f_{q-1}(\vec{x}, \vec{y}) \tag{3}$$

$$f_i(\vec{x}, \vec{y}) := \sum_{j,k<q} \alpha_{i,j,k} x_j y_k \tag{4}$$

Here, $\alpha_{i,j,k}$ (i=0, . . . , q-1; j=0, . . . , q-1; k=0, . . . , q-1) is a parameter for uniform association of the elements of two rings $R^q$ with the elements of one ring $R^q$. There can be a plurality of types of parameters $\alpha_{i,j,k}$, but in consideration of simplifying the computation, it is desirable that $q^3$ values with the largest number of 0's included therein is selected as the parameter $\alpha_{i,j,k}$. For example, when R is a field and the parameter $\alpha_{i,j,k}$ is determined so that $R^q$ is an enlarged field of the field R, it is possible to efficiently detect tampering.

A result of comparing the communication traffic between the embodiment and the prior art is shown. For example, when the comparison is made between a case where a field F in the embodiment is a finite field GF(2) with the order of 2 and the technique described in Non-patent literature 1, with the same tampering success probability $O(N^{-2})$, the communication traffic of each party is about 10N bits in Non-patent literature 1, whereas the communication traffic is only about 7N bits in the embodiment.

The points of the present invention are as follows. At first, in Non-patent literature 1 that is the prior art, the tampering detection is performed on the multiplication triple. On the other hand, in the present invention, from the beginning, the tampering detection using the multiplication triple is performed on the multiplication to be computed. Further, in Non-patent literature 1, the processing is performed with an integer multiple of the number of multiplications to be computed taken as a unit. On the other hand, in the present invention, the processing can be performed in parallel in the unit that is the same as the number of multiplications to be computed. Therefore, the multiplication with tampering detection can be performed more efficiently than in the prior art.

Although the embodiment of the present invention has been described above, a specific configuration is not limited to these embodiments, and even if there is an appropriate design change or the like without departing from the scope of the invention, it is needless to say that such a change or the like is included in the present invention. Various sorts of processing described in the embodiment are not only executed chronologically in the order described but may be executed in parallel or individually as required or in accordance with the processing capacity of the apparatus that executes the processing.

<Program and Recording Medium>

In a case where various processing functions in each apparatus described in the above embodiment are realized by a computer, a program describes the processing contents of the functions to be provided in each apparatus. Then, by the computer executing the program, various processing functions in each apparatus described above are realized on the computer.

The program describing the processing contents can be recorded in a computer-readable recording medium. The computer-readable recording medium may, for example, be a magnetic recording device, an optical disk, a magneto-optical recording medium, a semiconductor memory, or the like.

The program is distributed by, for example, the sale, transfer, lending, or the like of a portable recording medium such as a DVD or a CD-ROM in which the program is recorded. Further, the program may be previously stored into a storage device of a server computer, and the program may be transferred from the server computer to another computer via the network to distribute the program.

The computer to execute such a program first stores a program, such as a program recorded in a portable recording medium or a program transferred from the server computer, temporarily into its own storage. Then, at the time of executing the processing, the computer reads the program stored in its own storage and executes the processing in accordance with the read program. As another form of executing the program, the computer may read the program directly from the portable recording medium and executes the processing in accordance with the program, or further, each time the program is transferred from the server computer to the computer, the computer may successively execute the processing in accordance with the received program. The program may not be transferred from the server computer to the computer, but the processing described above may be executed by a so-called ASP (application service provider) service that realizes the processing functions only by instructing the execution and obtaining the result. Note that the program in the present form includes one equivalent to a program, the one being information to be used for processing by an electronic computer (data that is not a direct command to the computer but has the property of defining the processing of the computer).

Further, in the present form, the present apparatus has been configured by executing predetermined programs on the computer, but at least some of the processing contents of these may be realized in hardware.

What is claimed is:

1. A secret tampering detection system, in which σ represents an arbitrary integer of 1 or more, N and D represent predetermined natural numbers, i represents each integer of 0 or more and less than a, and j represents each integer of 0 or more and less than D, the secret tampering detection system including at least three secret tampering detection apparatuses, the secret tampering detection system inputting a share [$\vec{x}$] that becomes a vector $\vec{x}$ with N elements when reconstructed and a share [$\vec{y}$] that becomes a vector $\vec{y}$ with N elements when reconstructed, and outputting a share [$\vec{z}$] that becomes a vector $\vec{z}$ when reconstructed, the vector $\vec{z}$ being a result of multiplying each element of the vector $\vec{x}$ and each element of the vector $\vec{y}$ respectively, wherein each of the secret tampering detection apparatuses includes processing circuitry configured to:
generate, for each integer i, σ shares [$\vec{r}_i$] each of which becomes a random number vector $\vec{r}_i$ with N+D elements when reconstructed and σ shares [$\vec{s}_i$] each of which becomes a random number vector $\vec{s}_i$ with N+D elements when reconstructed;
multiply, for each integer i, the share [$\vec{r}_i$] and the share [$\vec{s}_i$] by secure computation to generate σ shares [$\vec{t}_i$] each of which becomes a vector $\vec{t}_i$ when reconstructed, the vector $\vec{t}_i$ being a result of multiplying each element of the vector $\vec{r}_i$ and each element of the vector $\vec{s}_i$ respectively;
multiply the share [$\vec{x}$] and the share [$\vec{y}$] by secure computation to generate the share [$\vec{z}$];
randomly select, for each integer i, D different integers $p_{i,j}$, each of the integers $p_{i,j}$ being 0 or more and less than D+N, and discloses a $p_{i,j}$-th element of each of the shares [$\vec{r}_i$], [$\vec{s}_i$], [$\vec{t}_i$], to confirm whether a set of the disclosed values corresponding respectively to the shares [$\vec{r}_i$], [$\vec{s}_i$], [$\vec{t}_i$] has integrity as multiplication;
generate, for each integer i, shares [$\vec{r}'_i$], [$\vec{s}'_i$], [$\vec{t}'_i$] obtained by performing random substitution on predetermined elements of each of the shares [$\vec{r}_i$], [$\vec{s}_i$], [$\vec{t}_i$], where the predetermined elements are all elements except for the $p_{i,j}$-th element;
compute and disclose [$\vec{x}-\vec{r}'_i$], [$\vec{y}-\vec{s}'_i$] for each integer i;
compute, for each integer i, [$\vec{c}_i$]:=[$\vec{z}$]−($\vec{x}-\vec{r}'_i$)[$\vec{y}$]−($\vec{y}-\vec{s}'_i$)[$\vec{r}'_i$]−[$\vec{t}'_i$] to generate a share [$\vec{c}_i$] that becomes a vector $\vec{c}_i$ of a verification value $c_i$ when reconstructed, and
confirm, for each integer i, that the verification values $c_i$ are all zero by using the share [$\vec{c}_i$].

2. The secret tampering detection system according to claim 1, wherein
the processing circuitry generates the share [$\vec{r}_i$] and the share [$\vec{s}_i$] by using a random number generation protocol which can detect tampering during processing,
the processing circuitry multiplies the share [$\vec{r}_i$] and the share [$\vec{s}_i$] by using a multiplication protocol which do not detect tampering during processing,
the processing circuitry multiplies the share [$\vec{x}$] and the share [$\vec{y}$] by using the multiplication protocol which do not detect tampering during processing,
the processing circuitry discloses the $p_{i,j}$-th element of each of the shares [$\vec{r}_i$], [$\vec{s}_i$], [$\vec{t}_i$] by using a disclosure protocol which can detect tampering during processing, and
the processing circuitry discloses the [$\vec{x}-\vec{r}'_i$], [$\vec{y}-\vec{s}'_i$] by using the disclosure protocol which can detect tampering during processing.

3. The secret tampering detection system according to claim 1, wherein the processing circuitry computes a checksum formed by a product sum of each element of the share [$\vec{c}_i$] and a power of a random number r, and confirms that all the verification values $c_i$ are zero based on whether the checksum c is zero.

4. A secret tampering detection apparatus, in which c represents an arbitrary integer of 1 or more, N and D represent predetermined natural numbers, i represents each integer of 0 or more and less than a, and j represents each integer of 0 or more and less than D, the secret tampering detection apparatus inputting a share [$\vec{x}$] that becomes a vector $\vec{x}$ with N elements when reconstructed and a share [$\vec{y}$] that becomes a vector $\vec{y}$ with N elements when reconstructed, and outputting a share [$\vec{z}$] that becomes a vector $\vec{z}$ when reconstructed, the vector $\vec{z}$ being a result of multiplying each element of the vector $\vec{x}$ and each element of the vector $\vec{y}$ respectively, the secret tampering detection apparatus comprising processing circuitry configured to:
generate, for each integer i, σ shares [$\vec{r}_i$] each of which becomes a random number vector $\vec{r}_i$ with N+D elements when reconstructed and σ shares [$\vec{s}_i$] each of which becomes a random number vector $\vec{s}_i$ with N+D elements when reconstructed;
multiply, for each integer i, the share [$\vec{r}_i$] and the share [$\vec{s}_i$] by secure computation to generate σ shares [$\vec{t}_i$] each of which becomes a vector $\vec{t}_i$ when reconstructed, the vector $\vec{t}_i$ being a result of multiplying each element of the vector $\vec{r}_i$ and each element of the vector $\vec{s}_i$ respectively;
multiply the share [$\vec{x}$] and the share [$\vec{y}$] by secure computation to generate the share [$\vec{z}$];
randomly select, for each integer i, D different integers $p_{i,j}$, each of the integers $p_{i,j}$ being 0 or more and less than D+N, and discloses a $p_{i,j}$-th element of each of the shares [$\vec{r}_i$], [$\vec{s}_i$], [$\vec{t}_i$], to confirm whether a set of the disclosed values corresponding respectively to the shares [$\vec{r}_i$], [$\vec{t}_i$] has integrity as multiplication;
generate, for each integer i, shares [$\vec{r}'_i$], [$\vec{s}'_i$], [$\vec{t}'_i$] obtained by performing random substitution on predetermined elements of each of the shares [$\vec{r}_i$], [$\vec{s}_i$], [$\vec{t}_i$], where the predetermined elements are all elements except for the $p_{i,j}$-th element;
compute and discloses [$\vec{x}-\vec{r}'_i$], [$\vec{y}-\vec{s}'_i$] for each integer i;
compute, for each integer i, [$\vec{c}_i$]:=[$\vec{z}$]−($\vec{x}-\vec{r}'_i$)[$\vec{r}'_i$]−[$\vec{t}'_i$] to generate a share [$\vec{c}_i$] that becomes a vector $\vec{c}_i$ of a verification value $c_i$ when reconstructed; and
confirm, for each integer i, that the verification values $c_i$ are all zero by using the share [$\vec{c}_i$].

5. A secret tampering detection method, in which represents an arbitrary integer of 1 or more, N and D represent predetermined natural numbers, i represents each integer of 0 or more and less than σ, and j represents each integer of 0 or more and less than D, the secret tampering detection method being executed by a secret tampering detection system that includes at least three secret tampering detection apparatuses, the secret tampering detection method inputting a share [$\vec{x}$] that becomes a vector $\vec{x}$ with N elements when reconstructed and a share [$\vec{y}$] that becomes a vector $\vec{y}$ with N elements when reconstructed, and outputting a share [$\vec{z}$] that becomes a vector $\vec{z}$ when reconstructed, the vector $\vec{z}$ being a result of multiplying each element of the vector $\vec{x}$ and each element of the vector $\vec{y}$ respectively, the secret tampering detection method comprising:
generating, for each integer i, σ shares [$\vec{r}_i$] each of which becomes a random number vector $\vec{r}_i$ with N+D elements when reconstructed and σ shares [$\vec{s}_i$] each of which becomes a random number vector $\vec{s}_i$ with N+D elements when reconstructed by processing circuitry of each of the secret tampering detection apparatuses;

multiplying, for each integer i, the share $[\vec{r}_i]$ and the share $[\vec{s}_i]$ by secure computation to generate σ shares $[\vec{t}_i]$ each of which becomes a vector $\vec{t}_i$ when reconstructed, the vector $\vec{t}_i$ being a result of multiplying each element of the vector $\vec{r}_i$ and each element of the vector $\vec{s}_i$ respectively for each of the elements by the processing circuitry of each of the secret tampering detection apparatuses;

multiplying the share $[\vec{x}]$ and the share $[\vec{y}]$ by secure computation to generate the share $[\vec{z}]$ by the processing circuitry of each of the secret tampering detection apparatuses;

randomly selecting, for each integer i, D different integers $p_{i,j}$, each of the integers $p_{i,j}$ being 0 or more and less than D+N, and discloses a $p_{i,j}$-th element of each of the shares $[\vec{r}_i]$, $[\vec{s}_i]$, $[\vec{t}_i]$, to confirm whether a set of the disclosed values corresponding respectively to the shares $[\vec{r}_i]$, $[\vec{s}_i]$, $[\vec{t}_i]$ has integrity as multiplication by the processing circuitry of each of the secret tampering detection apparatuses;

generating, for each integer i, shares $[\vec{r}'_i]$, $[\vec{s}'_i]$, $[\vec{t}'_i]$ obtained by performing random substitution on predetermined elements of each of the shares $[\vec{r}_i]$, $[\vec{s}_i]$, $[\vec{t}_i]$, where the predetermined elements are all elements except for the $p_{i,j}$-th element by the processing circuitry of each of the secret tampering detection apparatuses;

computing and disclosing $[\vec{x}-\vec{r}'_i]$, $[\vec{y}-\vec{s}'_i]$ for each integer i by the processing circuitry of each of the secret tampering detection apparatuses;

computing, for each integer i, $[\vec{c}_i]:=[\vec{z}]-(\vec{x}-\vec{r}'_i)[\vec{y}]-(\vec{y}-\vec{s}'_i)[\vec{r}'_i]-[\vec{t}'_i]$ to generate a share $[\vec{c}_i]$ that becomes a vector $\vec{c}_i$ of a verification value $c_i$ when reconstructed by the processing circuitry of each of the secret tampering detection apparatuses; and confirming, for each integer i, that the verification values $c_i$ are all zero by using the share $[\vec{c}_i]$ by the processing circuitry of each of the secret tampering detection apparatuses.

6. A non-transitory computer readable medium including computer executable instructions that make a secret tampering detection apparatus, in which σ represents an arbitrary integer of 1 or more, N and D represent predetermined natural numbers, i represents each integer of 0 or more and less than σ, and j represents each integer of 0 or more and less than D, the secret tampering detection apparatus inputting a share $[\vec{x}]$ that becomes a vector $\vec{x}$ with N elements when reconstructed and a share $[\vec{y}]$ that becomes a vector $\vec{y}$ with N elements when reconstructed, and outputting a share $[\vec{z}]$ that becomes a vector $\vec{z}$ when reconstructed, the vector $\vec{z}$ being a result of multiplying each element of the vector $\vec{x}$ and each element of the vector $\vec{y}$ respectively, the secret tampering detection apparatus performs a method comprising:

generating, for each integer i, σ shares $[\vec{r}_i]$ each of which becomes a random number vector $\vec{r}_i$ with N+D elements when reconstructed and σ shares $[\vec{s}_i]$ each of which becomes a random number vector $\vec{s}_i$ with N+D elements when reconstructed;

multiplying, for each integer i, the share $[\vec{r}_i]$ and the share $[\vec{s}_i]$ by secure computation to generate σ shares $[\vec{t}_i]$ each of which becomes a vector $\vec{t}_i$ when reconstructed, the vector $\vec{t}_i$ being a result of multiplying each element of the vector $\vec{r}_i$ and each element of the vector $\vec{s}_i$ respectively;

multiplying the share $[\vec{x}]$ and the share $[\vec{y}]$ by secure computation to generate the share $[\vec{z}]$;

randomly selecting, for each integer i, D different integers $p_{i,j}$, each of the integers $p_{i,j}$ being 0 or more and less than D+N, and discloses a $p_{i,j}$-th element of each of the shares $[\vec{r}_i]$, $[\vec{s}_i]$, $[\vec{t}_i]$, to confirm whether a set of the disclosed values corresponding respectively to the shares $[\vec{r}_i]$, $[\vec{s}_i]$, $[\vec{t}_i]$ has integrity as multiplication;

generating, for each integer i, shares $[\vec{r}'_i]$, $[\vec{s}'_i]$, $[\vec{t}'_i]$ obtained by performing random substitution on predetermined elements of each of the shares $[\vec{r}_i]$, $[\vec{s}_i]$, $[\vec{t}_i]$, where the predetermined elements are all elements except for the $p_{i,j}$-th element;

computing and disclosing $[\vec{x}-\vec{r}'_i]$, $[\vec{y}-\vec{s}'_i]$ for each integer i;

computing, for each integer i, $[\vec{c}_i]:=[\vec{z}]-(\vec{x}-\vec{r}'_i)[\vec{r}'_i]-[\vec{t}'_i]$ to generate a share $[c_i]$ that becomes a vector $\vec{c}_i$ of a verification value $c_i$ when reconstructed; and confirming, for each integer i, that the verification values $c_i$ are all zero by using the share $[\vec{c}_i]$.

\* \* \* \* \*